US012757292B2

(12) United States Patent
Liu

(10) Patent No.: US 12,757,292 B2
(45) Date of Patent: Oct. 6, 2026

(54) MULTICAST SERVICE TRANSMISSION, TRANSMISSION INDICATION METHOD AND APPARATUS, TERMINAL, AND NETWORK SIDE DEVICE

(71) Applicant: VIVO MOBILE COMMUNICATION CO., LTD., Guangdong (CN)

(72) Inventor: Jiamin Liu, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 337 days.

(21) Appl. No.: 18/397,336

(22) Filed: Dec. 27, 2023

(65) Prior Publication Data

US 2024/0130003 A1 Apr. 18, 2024

Related U.S. Application Data

(63) Continuation of application No. PCT/CN2022/101481, filed on Jun. 27, 2022.

(30) Foreign Application Priority Data

Jul. 2, 2021 (CN) ......................... 202110750587.8

(51) Int. Cl.
*H04L 12/00* (2006.01)
*H04W 4/12* (2009.01)
(Continued)

(52) U.S. Cl.
CPC ............. *H04W 76/40* (2018.02); *H04W 4/12* (2013.01); *H04W 76/27* (2018.02)

(58) Field of Classification Search
CPC ....... H04W 76/40; H04W 4/12; H04W 76/27; Y02D 30/70
(Continued)

(56) References Cited

U.S. PATENT DOCUMENTS 7,924,760 B2 * 4/2011 Ding ..................... H04W 76/40 455/445
8,406,125 B2 * 3/2013 Dholakia ............. H04L 49/354 455/445
(Continued)

FOREIGN PATENT DOCUMENTS

CN 113225769 A 8/2021
EP 4096285 A1 11/2022
(Continued)

OTHER PUBLICATIONS

CN115915025A, Communication method and device, chip, chip module, storage medium, 20221, 10 Pages (Year: 2021).*
(Continued)

*Primary Examiner* — Frantz Coby
(74) *Attorney, Agent, or Firm* — Foley & Lardner LLP

(57) ABSTRACT

A multicast service transmission method, a multicast service transmission indication method, an apparatus, a terminal and a network side device, which belongs to the field of communication technology. The multicast service transmission indication method in the embodiment of this application includes: sending, by a network side device, state indication information to a terminal, where the state indication information is used to assist the terminal in determining a state when receiving a multicast service.

20 Claims, 4 Drawing Sheets

(51) Int. Cl.
*H04W 76/27* (2018.01)
*H04W 76/40* (2018.01)

(58) Field of Classification Search
USPC .......................................................... 370/312
See application file for complete search history.

(56) References Cited

U.S. PATENT DOCUMENTS

| | | | | |
|---|---|---|---|---|
| 8,655,264 | B2 * | 2/2014 | Kameno | H04W 68/12 455/3.06 |
| 11,758,612 | B2 * | 9/2023 | Huang | H04W 4/06 370/312 |
| 2010/0265866 | A1 * | 10/2010 | Chao | H04W 72/30 370/312 |
| 2010/0322128 | A1 * | 12/2010 | Becker | H04W 4/08 370/312 |
| 2012/0039232 | A1 * | 2/2012 | Kwon | H04W 72/23 370/312 |
| 2013/0028165 | A1 | 1/2013 | Kim et al. | |
| 2013/0242845 | A1 * | 9/2013 | Kone | H04W 76/40 370/312 |
| 2016/0119762 | A1 * | 4/2016 | Zhu | H04B 7/0452 370/312 |
| 2016/0164645 | A1 * | 6/2016 | Suzuki | H04L 5/0048 370/312 |
| 2021/0068003 | A1 * | 3/2021 | Kadiri | H04L 1/1812 |
| 2023/0034791 | A1 | 2/2023 | Zhou et al. | |
| 2023/0090851 | A1 * | 3/2023 | Xin | H04W 72/30 370/312 |
| 2023/0156436 | A1 * | 5/2023 | Li | H04W 4/08 370/312 |
| 2023/0156749 | A1 * | 5/2023 | Liu | H04L 1/1896 370/312 |
| 2023/0188271 | A1 * | 6/2023 | Lipka | H04W 72/30 370/312 |

FOREIGN PATENT DOCUMENTS

| | | | | |
|---|---|---|---|---|
| WO | WO-2011047532 | A1 * | 4/2011 | H04W 72/30 |
| WO | WO-2014071784 | A1 * | 5/2014 | H04W 28/18 |
| WO | 2021041601 | A1 | 3/2021 | |

OTHER PUBLICATIONS

International Search Report and Written Opinion for Application No. PCT /CN2022/101481, dated Aug. 26, 2022, 10 Pages.
Vivo "General considerations on NR MBS" 3GPP TSG-RAN WG2 Meeting #112-electronic, Online, Nov. 2020, R2-2010214, 4 Pages.
Intel Corporation. MBS L2 Architecture, Control Plane and SA2 LS Discussion. 3GPP TSG-RAN WG2 Meeting #113-e.R2-2101051. Online. Jan. 2020. 10 pages.
European Search Report for Application No. 22831956.2, Mailed Sep. 19, 2024, 9 pages.

* cited by examiner

MULTICAST SERVICE TRANSMISSION, TRANSMISSION INDICATION METHOD AND APPARATUS, TERMINAL, AND NETWORK SIDE DEVICE

CROSS-REFERENCE TO RELATED APPLICATIONS

This application is a continuation of PCT International Application No. PCT/CN2022/101481 filed on Jun. 27, 2022, which claims priority to Chinese Patent Application No. 202110750587.8 filed on Jul. 2, 2021, which are incorporated herein by reference in their entireties.

TECHNICAL FIELD

This application belongs to the field of communications, and in particular relates to a multicast service transmission, a transmission indication method and apparatus, a terminal, and a network side device.

BACKGROUND

In the existing technology, new radio (New Radio, NR) broadcast and multicast services are received in different ways respectively. Broadcast adopts delivery mode 2 (delivery mode 2), that is, in order to ensure that user equipment (User Equipment, UE, also called terminal) can receive in an idle/inactive (inactive)/connected (connected) state, all broadcast-related configuration information and service data are sent in broadcast mode; while multicast (multicast) service is sent in delivery mode 1, that is, only connected UE can obtain multicast service-related configuration information through dedicated radio resource control (Radio Resource Control, RRC) signaling to receive service data.

In the above delivery mode 1 for multicast services, since all interested UEs are required to enter the connected state to obtain configuration and receive services, when the number of UEs is large, the system has excessively high loads or even is overloaded, affecting other unicast and multicast services, which is not conducive to network efficiency and overall performance.

SUMMARY

Embodiments of this application provide a multicast service transmission, a transmission indication method and apparatus, a terminal, and a network side device, which can solve the problem that in the existing delivery mode for multicast services, when the number of UEs is large, the system has excessively high loads or even is overloaded, affecting other unicast and multicast services, which is not conducive to network efficiency and overall performance.

In a first aspect, a multicast service transmission indication method is provided, including:

sending, by a network side device, state indication information to a terminal;

where the state indication information is used to assist the terminal in determining a state when a receiving multicast service.

In a second aspect, a multicast service transmission indication apparatus is provided, including:

a sending module, configured to send state indication information to a terminal;

where the state indication information is used to assist the terminal in determining a state when a receiving multicast service.

In a third aspect, a multicast service transmission method is provided, including:

receiving, by a terminal, state indication information sent by a network side device, where the state indication information is used to assist the terminal in determining a state when receiving a multicast service; and receiving, by the terminal, a multicast service according to the state indication information.

In a fourth aspect, a multicast service transmission apparatus is provided, including:

a first receiving module, configured to receive state indication information sent by a network side device, where the state indication information is used to assist the terminal in determining a state when receiving a multicast service; and a second receiving module, configured to receive a multicast service according to the state indication information.

In a fifth aspect, a terminal is provided, where the terminal includes a processor, a memory, and a program or an instruction stored in the memory and executable on the processor, and when the program or the instruction is executed by the processor, steps of the method according to the third aspect are implemented.

In a sixth aspect, a terminal is provided, including a processor and a communication interface, where the communication interface is configured to receive state indication information sent by a network side device, where the state indication information is used to assist the terminal in determining a state when receiving a multicast service; and receive a multicast service according to the state indication information.

In a seventh aspect, a network side device is provided. The network side device includes a processor, a memory, and a program or an instruction that is stored in the memory and that can be run on the processor, where when the program or the instruction is executed by the processor, the method according to the first aspect is implemented.

In an eighth aspect, a network side device is provided, including a processor and a communication interface, where the communication interface is configured to send state indication information to a terminal;

where the state indication information is used to assist the terminal in determining a state when a receiving multicast service.

In a ninth aspect, a readable storage medium is provided, where a program or an instruction is stored on the readable storage medium, and the program or the instruction is executed by a processor to implement the steps of the method according to the first aspect or the steps of the method according to the third aspect.

In a tenth aspect, a chip is provided. The chip includes a processor and a communication interface. The communication interface is coupled to the processor. The processor is configured to run programs or instructions to implement steps of the method according to the first aspect or the third aspect.

In an eleventh aspect, a computer program product is provided, the computer program product is stored in a non-volatile storage medium, and the computer program product is executed by at least one processor to implement steps of the method according to the first aspect or the third aspect.

In the embodiment of this application, state indication information is sent to the terminal to assist the terminal in determining a state when receiving a multicast service, so that the terminal can select an appropriate state for receiving a multicast service. This can avoid as much as possible that the system has excessively high loads or even is overloaded, and improve network efficiency and overall performance.

DETAILED DESCRIPTION

The following clearly describes the technical solutions in the embodiments of this application with reference to the accompanying drawings in the embodiments of this application. Apparently, the described embodiments are some but not all the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and the character "/" generally represents an "or" relationship between associated objects.

It should be noted that, the technologies described in the embodiments of this application are not limited to a Long Term Evolution (Long Term Evolution, LTE)/LTE-Advanced (LTE-Advanced, LTE-A) system, and can also be used in other wireless communication systems such as Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), Single-carrier Frequency-Division Multiple Access (Single-carrier Frequency-Division Multiple Access, SC-FDMA), and another system. The terms "system" and "network" in the embodiments of this application may be used interchangeably. The technologies described can be applied to both the systems and the radio technologies mentioned above as well as to other systems and radio technologies. A new radio (New Radio, NR) system is described in the following description for illustrative purposes, and the NR terminology is used in most of the following description, although these technologies can also be applied to applications other than the NR system application, such as the $6^{th}$ generation (6th Generation, 6G) communication system.

Figure 1:
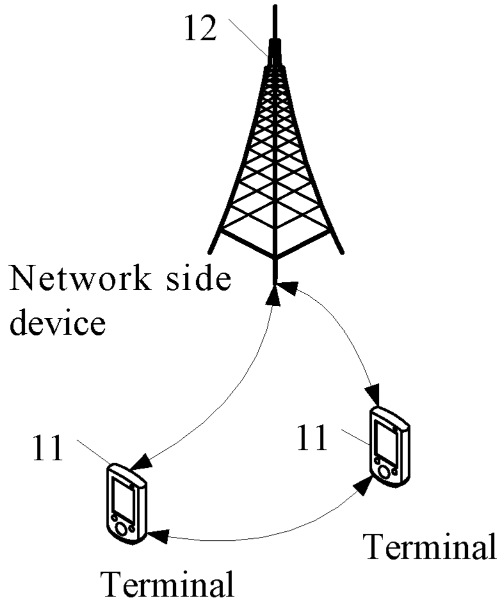
FIG. 1 is a block diagram of a wireless communication system to which the embodiments of this application can be applied.

FIG. 1 is a block diagram of a wireless communications system to which embodiments of this application can be applied. The wireless communications system includes a terminal 11 and a network side device 12. The terminal 11 may also be called a terminal device or user equipment (User Equipment, UE), and the terminal 11 may be a mobile phone, a tablet personal computer (Tablet Personal Computer), a laptop computer (Laptop Computer) or a notebook computer, a personal digital Assistant (Personal Digital Assistant, PDA), a palmtop computer, a netbook, an ultra-mobile personal computer (Ultra-Mobile Personal Computer, UMPC), a mobile Internet device (Mobile Internet Device, MID), a wearable device (Wearable Device) or a vehicle-mounted device (Vehicle User Equipment, VUE), a pedestrian terminal (Pedestrian User Equipment, PUE), and other terminal side devices. The wearable device includes: smart watches, bracelets, earphones, glasses, etc. It should be noted that a specific type of the terminal 11 is not limited in the embodiments of this application. The network side device 12 may be a base station or a core network. The base station may be referred to as a node B, an evolved node B, an access point, a base transceiver station (Base Transceiver Station, BTS), a radio base station, a radio transceiver, a basic service set (Basic Service Set, BSS), an extended service set (Extended Service Set, ESS), a node B, an evolved node B (eNB), a home node B, a home evolved node B, a wireless local area network (Wireless Local Area Networks, WLAN) access point, a wireless fidelity (Wireless Fidelity, WiFi) node, a transmitting receiving point (Transmitting Receiving Point, TRP), or other appropriate terms in the art. As long as a same technical effect is achieved, the base station is not limited to a specified technical term. It should be noted that, in embodiments of this application, only a base station in the NR system is used as an example, but a specific type of the base station is not limited.

The multicast service transmission method, the multicast service transmission indication method, the apparatus, the terminal and the network side equipment provided by the embodiments of this application will be described in detail below with reference to the accompanying drawings through some embodiments and application scenarios.

Figure 2:
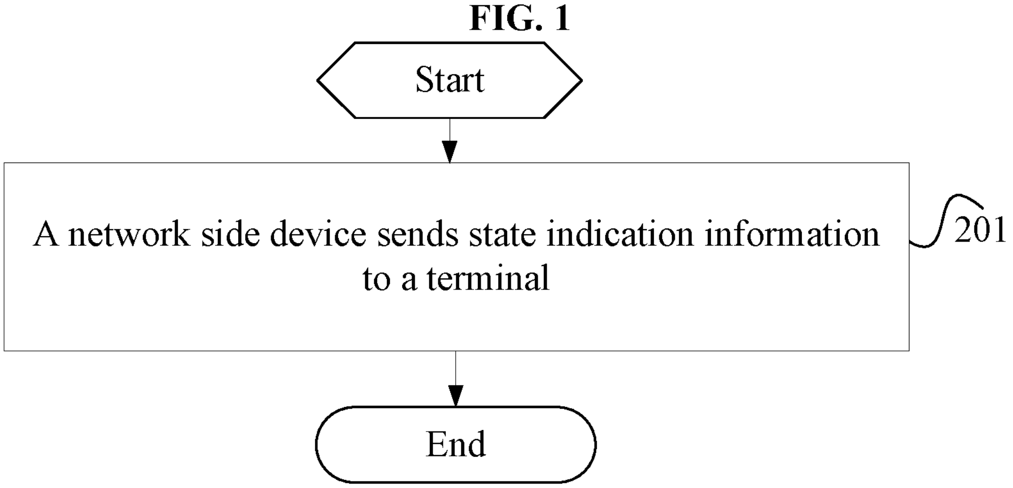
FIG. 2 is a schematic flowchart of a multicast service transmission indication method according to an embodiment of this application.

As shown in FIG. 2, this embodiment of this application provides a multicast service transmission indication method, which includes:

Step 201: A network side device sends state indication information to a terminal.

The state indication information is used to assist the terminal in determining a state when a receiving multicast service.

It should be noted that this state refers to an RRC state of the terminal, that is, a connected state, an idle state or an inactive state.

Optionally, before step 201, the method may also include: determining, by a network side device, a current service type or a service type after a period of time; in a case that it is determined that the service type is a multicast service, the network side device then performs step 201.

It should be noted that the state indication information in the embodiment of this application is mainly used for the terminal to determine reception state information. The state indication information can indicate explicitly or implicitly. The two methods are described in detail below as follows.

1. Explicit Indication

It should be noted that in this case, the state indication information includes: reception state information.

It should be further noted that the network side device can determine, based on a first parameter, the reception state information corresponding to the terminal and the multicast service, and then send the information to the terminal.

Optionally, the first parameter includes: quality of service (QoS) and/or network load of the multicast service.

Specifically, the reception state information may include at least one of the following:

A11: The terminal receives a multicast service in the connected (Connected) state.

It should be noted that this case means that the terminal can only receive a multicast service in the connected state. That is, when receiving a service activation notification (activation notification), all terminals interested in multicast services need to enter the connected state to receive specified multicast services.

For example, if the network side device determines A11 based on the network load, and the network side device determines that the current load is small, in order to ensure the accuracy of service reception, it can directly indicate A11 to the terminal.

A12: The terminal can maintain reception of a multicast service in the current state.

It should be noted that this case means that the terminal can directly receive a multicast service in the current state without performing state transition. For example, when the terminal is in the idle state, if it needs to receive a multicast service, after the terminal obtains the indication that reception of the multicast service in the current state can be maintained, the terminal can directly receive the multicast service in the idle state. When the terminal is in the inactive (inactive, also called non-active) state, if it needs to receive a multicast service, after the terminal obtains the indication that reception of the multicast service in the current state can be maintained, the terminal can directly receive the multicast service in the inactive state. When the terminal is in the connected state, if it needs to receive the multicast service, after the terminal obtains the indication that reception of the multicast service in the current state can be maintained, the terminal can directly receive the multicast service in the connected state.

It should be noted that this case is especially applicable to terminals in the non-connected (Non-connected) state. That is, when receiving service activation notifications, all new-version terminals that are interested in multicast services can remain in their current states to receive specified services without triggering entry into the connection state.

A13: The terminal can receive a multicast service in the connected state and the non-connected state.

It should be noted that this case means that the terminal can receive the multicast service both in the connected state and in the non-connected state (that is, idle state or inactive state). After the terminal receives an indication that the multicast service can be received in the connected state and non-connected state, the terminal needs to determine a specific state in which the multicast service is received.

In other words, the network side device can allow some terminals to enter the connected state to receive multicast services, while other terminals stay in the idle state or inactive state to receive multicast services. For how to make judgment, refer to information such as the QoS requirements of multicast services, terminal preferences, and the ratio given by the network side device.

A14: A proportion parameter of terminals that can enter the connected state to receive a multicast service.

It should be noted that in this case, the network side device gives a value between 0 and 1, which represents the proportion of terminals that need to enter the connected state. For example, 0.4 refers to 40%, and 0.6 refers to 60%. When the network side device gives 0.6, it means that 60% terminals can be allowed to enter the connected state to receive multicast services.

A15: A proportion parameter of terminals that are allowed to receive a multicast service without entering the connected state.

It should be noted that in this case, the network side device gives a value between 0 and 1, which represents the proportion of terminals that do not need to enter the connected state. For example, 0.4 refers to 40%, and 0.6 refers to 60%. When the network side device gives 0.4, it means that 40% terminals can be allowed to receive multicast services without entering the connected state.

It should be further noted that the network side can also notify the terminal of the range of multicast services corresponding to the reception state information. Optionally, the reception state information is applicable to at least one of the following:

A21: A cell that sends the state indication information.

It should be noted that this case means that the reception state information is at the cell granularity, which means that all multicast services in the cell use the same set of reception state information. This is generally applicable to a case in which the cell (cell) has a high load and cannot allow any multicast service to enter the connected state, or a case in which the cell has a low load and it is recommended that all multicast services are received by entering the connected state, or a case in which it is determined based on proportions or demands whether all services are received in the connected state. In this case, the control granularity is coarser.

A22: A first multicast service.

It should be noted that the first multicast service refers to at least one multicast service, that is, any multicast service or any group of multicast services. That is, this case means that the reception state information is at multicast service granularity, which means that in the cell, the reception state information is configured separately for each multicast service or each group of multicast services. In this case, the control granularity is finer.

A23: A first area.

It should be noted that the first area refers to any area, that is, the reception state information is for the multicast service in a designated area. That is, when the terminal receives the multicast service in the designated area, the terminal uses the same state, and the designated area may be an area covered by multiple cells, that is, in this case, the first area is indicated by a cell list.

After obtaining the reception state information, when receiving the multicast service activation notification, the terminal can directly receive the multicast service in the corresponding state according to the instruction of the reception state information.

It should be noted that because A21 and A22 are clear state information, and A23 provides two options for the terminal. When the reception state information received by the terminal includes A23, the terminal needs to further determine the state, and the specific implementation method can be:

according to a manner in which the network side device determines the state indication information, determining, by the terminal, a target state in which the multicast service is received; and receiving, by the terminal, the multicast service in the target state.

It should be noted that, the implementation of determining, by the terminal according to a manner in which the network side device determines the state indication information, a target state in which the multicast service is received may include at least one of the following:

A31: In a case that the reception state information is determined by the network side device based on a first characteristic of the multicast service, the terminal compares the first characteristic of the multicast service with a characteristic threshold, and determines, based on a comparison result, the target state in which the multicast service is received.

It should be noted that the first feature mentioned in this application is a QoS condition, that is, this case means that the terminal needs to compare the QoS condition of the service that the terminal is interested in with the QoS condition threshold configured on the network side or specified by the standard. If the condition for reception in the connected state is met, for example, the service block error rate requirement is high, the terminal needs to enter the connected state for reception. If the condition in the connected state is not met or the condition in the non-connected state is met, for example, the service block error rate requirement is low, the terminal can stay in the current state for reception.

It should be further noted that the embodiment of this application preferably uses the block error rate for comparison. That is, in this case, the feature is the block error rate, and the feature threshold is the block error rate threshold. Specifically, according to the comparison result, the implementation method of determining the target state in which the multicast service is received includes one of the following:

A311: In a case that a block error rate of a target service is greater than or equal to a block error rate threshold, determine that the target state is a non-connected state.

It should be noted that when the block error rate of a multicast service is greater than or equal to the given block error rate threshold, it indicates that the multicast service has a lower requirement for the service block error rate, and the terminal can directly receive the multicast service in the non-connected state.

A312: In a case that a block error rate of a target service is less than a block error rate threshold, determine that the target state is a connected state.

It should be noted that when the block error rate of a multicast service is less than the given block error rate threshold, it indicates that the multicast service has a higher requirement for the service block error rate, and the terminal needs to receive the multicast service in the connected state.

A32: In a case that the reception state information is determined by the network side device based on a second parameter, the terminal generates a random number, and determines, based on a comparison result between the random number and the second parameter, the target state in which the multicast service is received, where the second parameter includes: a proportion parameter of terminals that can enter the connected state to receive a multicast service; or a proportion parameter of terminals that are allowed to receive a multicast service without entering the connected state.

It should be further noted that, optionally, in the case that the second parameter is a proportion parameter of terminals that can enter the connected state to receive a multicast service, the determining, according to the comparison result between the random number and the second parameter, the target state in which the multicast service is received includes one of the following:

A321: In a case that the random number is less than the second parameter, determine that the target state is the connected state.

That is, if the random number generated by the terminal is less than the proportion parameter of terminals that can enter the connected state to receive a multicast service, the terminal needs to receive the multicast service in the connected state.

A322: In a case that the random number is greater than or equal to the second parameter, determine that the target state is a non-connected state.

That is, if the random number generated by the terminal is greater than or equal to the proportion parameter of terminals that can enter the connected state to receive a multicast service, the terminal can receive the multicast service in the non-connected state.

Optionally, in the case that the second parameter is a proportion parameter of terminals that are allowed to receive a multicast service without entering the connected state, the determining, according to the comparison result between the random number and the second parameter, the target state in which the multicast service is received includes one of the following:

A323: In a case that the random number is less than the second parameter, determine that the target state is the non-connected state.

That is, if the random number generated by the terminal is less than the proportion parameter of terminals that are allowed to receive a multicast service without entering the connected state, the terminal can receive the multicast service in the non-connected state.

A324: In a case that the random number is greater than or equal to the second parameter, determine that the target state is a connected state.

That is, if the random number generated by the terminal is greater than or equal to the proportion parameter of terminals that are allowed to receive a multicast service without entering the connected state, the terminal needs to receive the multicast service in the non-connected state.

It should be further noted that when the method of determining the target state includes both A31 and A32, one of the following methods can be used:

A41: For a multicast service with a block error rate higher than the block error rate threshold, this case corresponds to a low block error rate requirement, and the terminal determines, according to the proportion, the probability of entering the connected state. For other multicast services, the terminal stays in the non-connected state by default.

A42: For a multicast service with a block error rate lower than the block error rate threshold, this case corresponds to a high block error rate requirement, and the terminal determines, according to the proportion, the probability of not entering the connected state. For other multicast services, the terminal enters the connected state for reception by default.

A33: Determine, according to a terminal requirement, a state in which the multicast service is received.

It should be noted that in this case, the terminal determines, based on its own needs, the state in which the multicast service is received. For example, if the terminal prefers to save power, the terminal can directly determine to receive the multicast service in the non-connected state.

It should also be noted that when the method of determining the target state includes both A32 and A33, since the random number method of A32 is to control the proportion of terminals entering the connected state, if a certain terminal prefers to save power or has a low service performance requirement, the random number method may not be used and the terminal directly chooses to stay in the current state, that is, does not enter the connected state for reception. This case does not increase the burden on the network load, and therefore the random number method may not be used. On the contrary, if a terminal particularly prefers high-quality reception, the terminal is not allowed to directly enter the connected state for reception without random number control. The main reason is that if all terminals are not controlled, the network load is very high.

2. Implicit Indication

It should be noted that in this case, the state indication information includes: a characteristic threshold of a multicast service that requires the terminal to enter a connected state for reception and/or a characteristic threshold of a multicast service that requires the terminal to remain in the current state for reception.

Preferably, the characteristic threshold includes: a block error rate threshold.

It should be noted that the network side device can give the state indication information explicitly or implicitly. For example, the block error rate threshold for a multicast service that needs to be received in the connected state is 10-4. Being explicit means to clearly indicate the condition, that is, the block error rate is less than 10-4, and whether there are a priority condition, a delay condition, or the like. Being implicit means to write these conditions as default parameters in the standard, and the network only needs to use 1 bit to indicate whether to use these conditions to judge. For example, if the condition that the block error rate threshold of a multicast service that needs to be received in the connected state is 10-4 needs to be used, this bit only needs to be set to 1, that is, it indicates that the state indication information includes: a feature of the characteristic threshold of the multicast service that needs to be received in the connected state.

It should be noted that after receiving the state indication information, the terminal needs to determine the target state in which the multicast service is received, and then receives the target multicast service in the target state.

Optionally, in this case, the specific implementation of the terminal is:

determining, by the terminal according to a relationship between a block error rate of a target multicast service corresponding to the block error rate threshold and the block error rate threshold, the target state in which the multicast service is received; and receiving the target multicast service in the target state.

Optionally, the determining, by the terminal according to a relationship between a block error rate of a target multicast service corresponding to the block error rate threshold and the block error rate threshold, the target state in which the multicast service is received includes at least one of the following:

B11: In a case that the block error rate of the target multicast service is less than the block error rate threshold, determine that the target state is the connected state.

It should be noted that this case corresponds to that the state indication information is the characteristic threshold of the multicast service that needs to be received in the connected state; that is, when the block error rate of a multicast service is less than the given block error rate threshold, it indicates that the multicast service has a higher requirement for the service block error rate, and the terminal needs to receive the multicast service in the connected state.

B12: In a case that the block error rate of the target multicast service is greater than or equal to the block error rate threshold, determine that the target state is the non-connected state.

It should be noted that this case corresponds to that the state indication information is the characteristic threshold of the multicast service that needs to be received in the current state; that is, when the block error rate of a multicast service is greater than or equal to the given block error rate threshold, it indicates that the multicast service has a lower requirement for the service block error rate, and the terminal can directly receive the multicast service in the non-connected state.

It should be further noted that the state indication information may also include at least one of the following:

B31: A proportion parameter of terminals that can enter the connected state to receive a multicast service.

B33: A proportion parameter of terminals that are allowed to receive a multicast service without entering the connected state.

Specifically, in this case, the terminal needs to first generate a random number; determine, based on the comparison result of the random number and the second parameter, the target state in which the multicast service is received; and receive the multicast service in the target state.

The second parameter includes: a proportion parameter of terminals that can enter the connected state to receive a multicast service; or a proportion parameter of terminals that are allowed to receive a multicast service without entering the connected state.

Optionally, in the case that the second parameter is a proportion parameter of terminals that can enter the connected state to receive a multicast service, the specific implementation of the terminal includes one of the following:

B41: In a case that the random number is less than the second parameter, determine that the target state is the connected state.

That is, if the random number generated by the terminal is less than the proportion parameter of terminals that can enter the connected state to receive a multicast service, the terminal needs to receive the multicast service in the connected state.

B42: In a case that the random number is greater than or equal to the second parameter, determine that the target state is a non-connected state.

That is, if the random number generated by the terminal is greater than or equal to the proportion parameter of terminals that can enter the connected state to receive a multicast service, the terminal can receive the multicast service in the non-connected state.

Optionally, in the case that the second parameter is a proportion parameter of terminals that are allowed to receive a multicast service without entering the connected state, the specific implementation of the terminal includes one of the following:

B51: In a case that the random number is less than the second parameter, determine that the target state is the non-connected state.

That is, if the random number generated by the terminal is less than the proportion parameter of terminals that are allowed to receive a multicast service without entering the connected state, the terminal can receive the multicast service in the non-connected state.

B52: In a case that the random number is greater than or equal to the second parameter, determine that the target state is a connected state.

That is, if the random number generated by the terminal is greater than or equal to the proportion parameter of terminals that are allowed to receive a multicast service without entering the connected state, the terminal needs to receive the multicast service in the non-connected state.

Optionally, an optional implementation of step 201 is:

sending target information to the terminal, where the target information carries the state indication information; and the target information includes at least one of the following:

C11: A system information block (System Information Block, SIB).

This case means that the state indication information can be applied to all multicast services in the SIB.

C12: A paging message used for multicast service activation notification.

It should be noted that this paging message is used to carry multicast service activation notification (multicast service activation notification). That is, in this case, the state indication information is accompanied by each multicast service activation notification and is only for specific multicast services.

It should be noted that C11 can be considered a common configuration and only appears in common signaling. That is, the SIB contains one or more sets of state indication information. If there is only one set, it means that all multicast services in this cell use this set of state indication information, or use this set of state indication information according to default rules. Instead, C12 can be considered a special configuration, and only appears for each specific service or a group of specific services, for example, is carried along with the activation notification of the service. In this case, the state indication information is only effective for this service or this group of services.

It should be further noted that when C11 and C12 exist at the same time, when there is state indication information for the service, the state indication information is used. When there is no state indication information for the service, the state indication information recommended in the SIB is used. If neither of the state indication information is available, the default mode is adopted. For example, a reception state is preset, for example, it is set that the multicast service is received in the connected state.

It should also be noted that the previously mentioned methods all represent the expectations and recommendations of the network side device. Optionally, the terminal can also report auxiliary information to the network side device to assist the network side device in determining the state indication information in consideration of user preferences.

Optionally, the assistance information includes at least one of the following:

D11: Power saving demand indication information.

It should be noted that the power saving demand indication information may be indication information of whether to save power.

For example, when the terminal needs to give priority to power saving, the power saving demand indication information is used to indicate that the terminal needs to save power.

D12: Reception effect indication information.

It should be noted that the reception effect indication information may be indication information of whether to use low-performance reception.

For example, when the terminal needs to adopt low-performance reception, the reception effect indication information is used to instruct the terminal to adopt low-performance reception.

D13: Reception state indication information.

It should be noted that the reception state indication information may be indication information of whether to receive in a non-connected state.

For example, when the terminal tends to receive in non-connected state, the reception state indication information is used to indicate that the terminal receives in the non-connected state.

Generally, the terminal needs to report auxiliary information in the connected state through uplink dedicated radio resource control (UL dedicated RRC) signaling. Therefore, the network side device instructs the terminal to enter the connected state and the terminal itself prefers to receive in the non-connected state. In this case, auxiliary information can be reported. That is, after the terminal enters the connected state according to the instructions of the network side device and receives the multicast service configuration and data through dedicated signaling, the terminal reports its own preference to the network side device, such as power saving priority, low performance priority, and preference for non-connected reception. After receiving the auxiliary information reported by the terminal, the network side device can release the terminal to the inactive state or even the idle state to continue receiving the multicast service.

Conversely, if the network side device controls the terminal to receive the multicast service in the non-connected state, one of the following implementations can be used:

Implementation 1: If the terminal is currently in the idle state, it is not recommended to report and then enter the connected state for reception. Otherwise, if there are many terminals that wish to request, the network load cannot bear, and the signaling overheads of state transition and auxiliary information reporting are wasted.

Implementation 2: If the terminal is currently in the connected state, for example, other unicast (unicast) services are being sent, reporting auxiliary information together can be considered to report the preference of the terminal to the network side device, for example, power is sufficient, performance is more important, or the connected state and point to point path (Point To Point leg, PTP leg) reception are preferred, to see if the network side has resources to configure for the terminal specifically.

Implementation 3: If the terminal is currently in the inactive state, the terminal can also return to the connected state to report, which is similar to the process of implementation 2.

It should also be noted that the network side device can also explicitly or implicitly indicate whether the above three implementations are allowed, and the terminal can perform the corresponding reporting process only if the terminal is allowed according to the indication.

It should be noted that the embodiment of this application provides a manner for the terminal to receive multicast services in the idle state and inactive state. The network side device can flexibly control, according to the needs, the state in which the terminal receives the service, so that the network side device can consider the reception effect of the terminal for the multicast service, and the overall system efficiency can be more flexibly improved.

It should be noted that the multicast service transmission indication method provided by the embodiment of this application may be performed by a multicast service transmission indication apparatus, or a control module in the multicast service transmission indication apparatus configured to execute the multicast service transmission indication method. In the embodiment of this application, the multicast service transmission indication method being performed by the multicast service transmission indication apparatus is used as an example to illustrate the multicast service transmission indication apparatus provided by the embodiment of this application.

Figure 3:
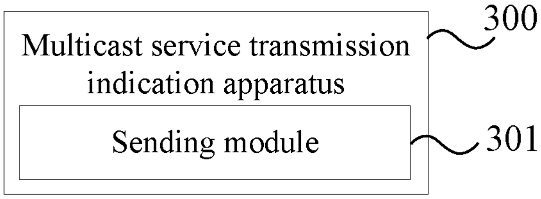
FIG. 3 is a schematic diagram of modules of a multicast service transmission indication apparatus according to an embodiment of this application.

As shown in FIG. 3, this embodiment of this application provides a multicast service transmission indication apparatus 300, which includes:

- a sending module 301, configured to send state indication information to a terminal.

The state indication information is used to assist the terminal in determining a state when a receiving multicast service.

Optionally, the multicast service transmission indication apparatus 300 may also include a determining unit, configured to determine a current service type or a service type after a period of time; and in a case that it is determined that the service type is a multicast service, the sending module 301 sends the state indication information to the terminal.

Optionally, the state indication information includes: reception state information;

- where the reception state information includes at least one of the following:
- the terminal receives a multicast service in a connected state;
- the terminal can maintain reception of a multicast service in the current state;
- the terminal can receive a multicast service in the connected state and the non-connected state;
- a proportion parameter of terminals that can enter the connected state to receive a multicast service; and
- a proportion parameter of terminals that are allowed to receive a multicast service without entering the connected state.

Optionally, the reception state information is applicable to at least one of the following:

- a cell that sends the state indication information;
- a first multicast service; and
- a first area.

Optionally, before the sending module 301 sends the state indication information to the terminal, the apparatus also includes:

- a determining module, configured to determine, according to a first parameter, the reception state information corresponding to the terminal and the multicast service;
- where the first parameter includes: quality of service (Quality of Service, QoS) and/or network load of the multicast service.

Optionally, the state indication information includes: a characteristic threshold of a multicast service that requires the terminal to enter a connected state for reception and/or a characteristic threshold of a multicast service that requires the terminal to remain in the current state for reception.

Optionally, the characteristic threshold includes:

- a block error rate threshold.

Optionally, the state indication information also includes at least one of the following:

- a proportion parameter of terminals that can enter the connected state to receive a multicast service; and
- a proportion parameter of terminals that are allowed to receive a multicast service without entering the connected state.

Optionally, the sending module 301 is configured to:

- send target information to the terminal, where the target information carries the state indication information; and
- the target information includes at least one of the following:
- a system information block SIB; and
- a paging message used for multicast service activation notification.

Optionally, the apparatus also includes:

- a third receiving module, configured to receive auxiliary information sent by the terminal;
- where the auxiliary information includes at least one of the following:
- power saving demand indication information;
- reception effect indication information; and
- reception state indication information.

It should be noted that, state indication information is sent to the terminal to assist the terminal in determining a state when receiving a multicast service, so that the terminal can select an appropriate state for receiving a multicast service. This can avoid as much as possible that the system has excessively high loads or even is overloaded, and improve network efficiency and overall performance.

Preferably, an embodiment of this application further provides a network side device, including a processor, a memory, and a program or an instruction stored in the memory and executable on the processor. When the program or instruction is executed by the processor, each process of the embodiment of the foregoing multicast service transmission indication method applied to the network side device, and the same technical effect can be achieved. To avoid repetition, details are not repeated herein.

An embodiment of this application further provides a readable storage medium. The computer readable storage medium stores a program or an instruction, and when the program or the instruction is executed by a processor, each process of the embodiment of the foregoing multicast service transmission indication method applied to the network side device is performed and the same technical effects can be achieved. To avoid repetition, details are not described herein again.

The computer readable storage medium is, for example, a read-only memory (Read-Only Memory, ROM for short), a random access memory (Random Access Memory, RAM for short), a magnetic disk, or an optical disc.

Embodiments of this application also provide a network side device, including a processor and a communication interface. The communication interface is configured to send state indication information to a terminal.

The state indication information is used to assist the terminal in determining a state when a receiving multicast service.

This network side device embodiment corresponds to the foregoing method embodiment on the network side device. Each implementation process and implementation of the foregoing method embodiment may be applicable to this network side device embodiment, and a same technical effect can be achieved.

Figure 4:
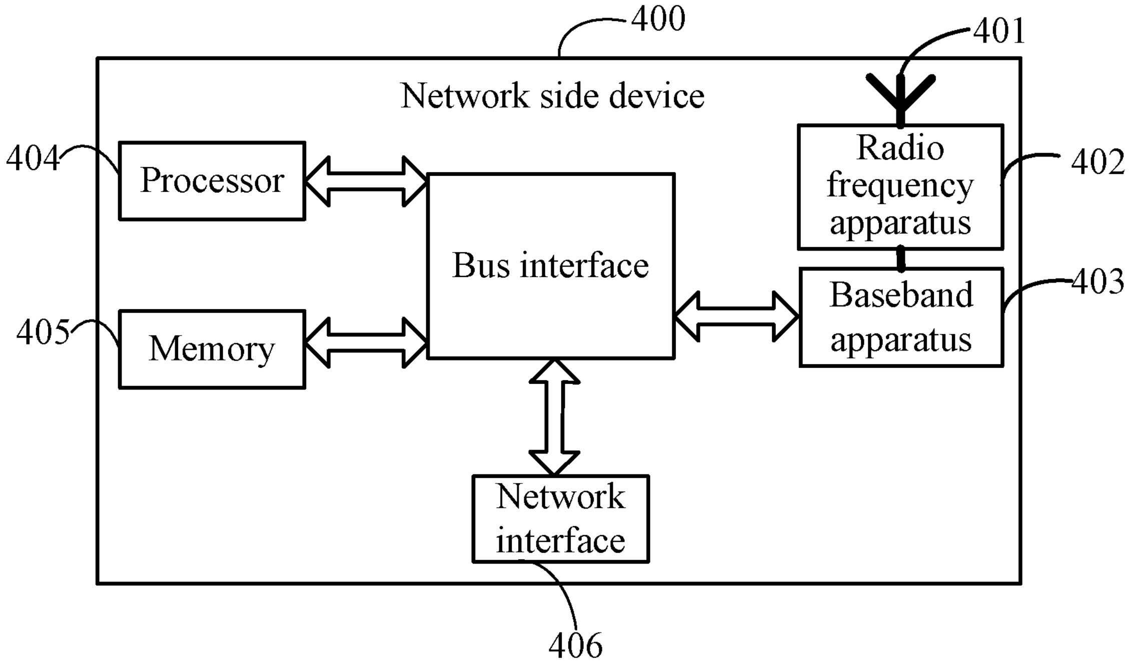
FIG. 4 is a structural block diagram of a network side device according to an embodiment of this application.

Specifically, an embodiment of this application further provides a network side device. As shown in FIG. 4, a network side device 400 includes an antenna 401, a radio frequency apparatus 402, and a baseband apparatus 403. The antenna 401 is connected to the radio frequency apparatus 402. In an uplink direction, the radio frequency apparatus 402 receives information by using the antenna 401, and sends the received information to the baseband apparatus 403 for processing. In a downlink direction, the baseband apparatus 403 processes to-be-sent information, and sends the information to the radio frequency apparatus 402. The radio frequency apparatus 402 processes the received information and then sends the information by using the antenna 401.

The frequency band processing apparatus may be located in the baseband apparatus 403. The method performed by the network side device in the foregoing embodiment may be implemented in the baseband apparatus 403. The baseband apparatus 403 includes a processor 404 and a memory 405.

The baseband apparatus 403 may include, for example, at least one baseband board, where a multiple chips are disposed on the baseband board. As shown in FIG. 4, one chip is, for example, the processor 404, which is connected to the memory 405, so as to invoke a program in the memory 405 to perform operations of the network side device shown in the foregoing method embodiment.

The baseband apparatus 403 may further include a network interface 406, configured to exchange information with the radio frequency apparatus 402. For example, the interface is a common public radio interface (common public radio interface, CPRI for short).

Specifically, the network side device in this embodiment of the present invention further includes an instruction or a program that is stored in the memory 405 and that can be run on the processor 404. The processor 404 invokes the instruction or the program in the memory 405 to perform the method performed by the modules shown in FIG. 3, and a same technical effect is achieved. To avoid repetition, details are not described herein again.

Figure 5:
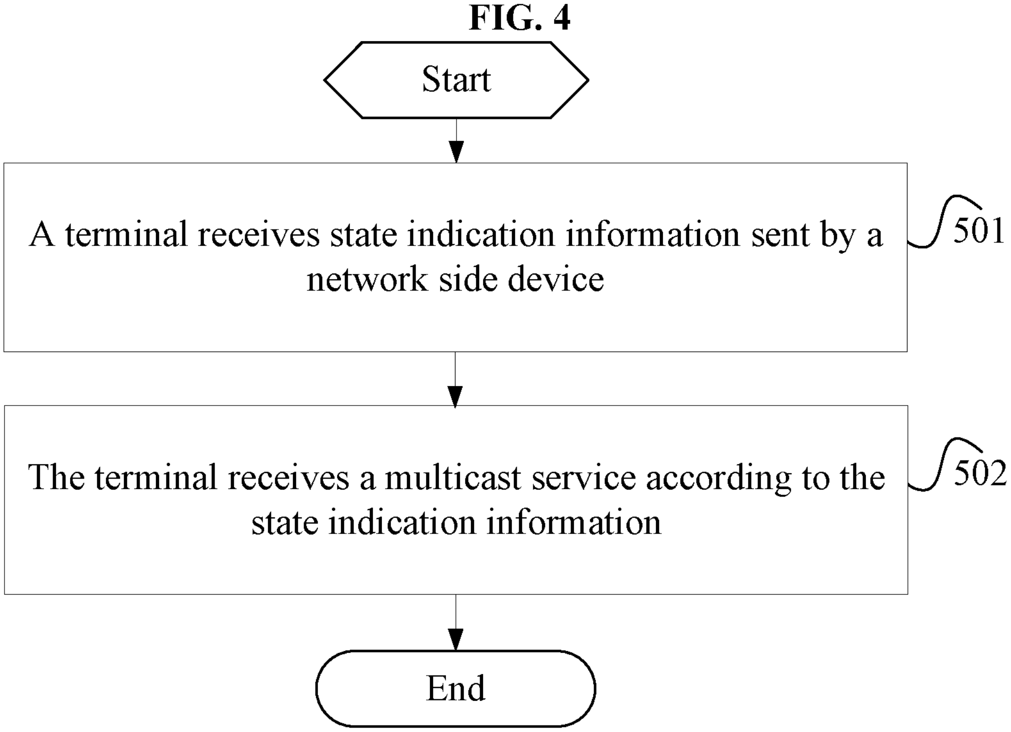
FIG. 5 is a schematic flowchart of a multicast service transmission method according to an embodiment of this application.

As shown in FIG. 5, this embodiment of this application further provides a multicast service transmission method, which includes:

Step 501: A terminal receives state indication information sent by a network side device, where the state indication information is used to assist the terminal in determining a state when receiving a multicast service.

Step 502: The terminal receives a multicast service according to the state indication information.

Optionally, the state indication information includes: reception state information;

- where the reception state information includes at least one of the following:
- the terminal receives a multicast service in a connected state;
- the terminal can maintain reception of a multicast service in the current state;
- the terminal can receive a multicast service in the connected state and the non-connected state;
- a proportion parameter of terminals that can enter the connected state to receive a multicast service; and
- a proportion parameter of terminals that are allowed to receive a multicast service without entering the connected state.

Optionally, the reception state information is applicable to at least one of the following:

- a cell that sends the state indication information;
- a first multicast service; and
- a first area.

Optionally, when the reception state information includes: the terminal can receive a multicast service in the current state and non-connected state, the receiving, by the terminal, a multicast service according to the state indication information includes:

- according to a manner in which the network side device determines the state indication information, determining, by the terminal, a target state in which the multicast service is received; and
- receiving, by the terminal, the multicast service in the target state.

Optionally, the determining, by the terminal according to a manner in which the network side device determines the state indication information, a target state in which the multicast service is received includes at least one of the following:

- in a case that the reception state information is determined by the network side device based on a first characteristic of the multicast service, comparing, by the terminal, the first characteristic of the multicast service with a characteristic threshold, and determining, based on a comparison result, the target state in which the multicast service is received;
- in a case that the reception state information is determined by the network side device based on a second parameter, generating, by the terminal, a random number, and determining, based on a comparison result between the random number and the second parameter, the target state in which the multicast service is received, where the second parameter includes: a proportion parameter of terminals that can enter the connected state to receive a multicast service; or a proportion parameter of terminals that are allowed to receive a multicast service without entering the connected state; and
- determining, according to a terminal requirement, the target state in which the multicast service is received.

Optionally, in a case that the first characteristic is a block error rate, the determining, based on a comparison result, the target state in which the multicast service is received includes one of the following:

- in a case that a block error rate of a target service is greater than or equal to a block error rate threshold, determining that the target state is a non-connected state; and
- in a case that a block error rate of a target service is less than a block error rate threshold, determining that the target state is a connected state.

Optionally, the state indication information includes: a characteristic threshold of a multicast service that requires the terminal to enter a connected state for reception and/or a characteristic threshold of a multicast service that requires the terminal to remain in the current state for reception.

Optionally, the characteristic threshold includes: a block error rate threshold.

Optionally, the receiving, by the terminal, a multicast service according to the state indication information includes:

- determining, by the terminal according to a relationship between a block error rate of a target multicast service corresponding to the block error rate threshold and the block error rate threshold, the target state in which the multicast service is received; and
- receiving the target multicast service in the target state.

Optionally, the determining, by the terminal according to a relationship between a block error rate of a target multicast service corresponding to the block error rate threshold and the block error rate threshold, the target state in which the multicast service is received includes at least one of the following:

in a case that the block error rate of the target multicast service is less than the block error rate threshold, determining that the target state is the connected state; and in a case that the block error rate of the target multicast service is greater than or equal to the block error rate threshold, determining that the target state is the non-connected state.

Optionally, the state indication information also includes at least one of the following:

a proportion parameter of terminals that can enter the connected state to receive a multicast service; and a proportion parameter of terminals that are allowed to receive a multicast service without entering the connected state.

Optionally, the receiving, by the terminal, a multicast service according to the state indication information includes:

generating, by the terminal, a random number;

determining, according to the comparison result between the random number and the second parameter, the target state in which the multicast service is received; and receiving the multicast service in the target state;

where the second parameter includes: a proportion parameter of terminals that can enter the connected state to receive a multicast service; or a proportion parameter of terminals that are allowed to receive a multicast service without entering the connected state.

Optionally, in the case that the second parameter is a proportion parameter of terminals that can enter the connected state to receive a multicast service, the determining, according to the comparison result between the random number and the second parameter, the target state in which the multicast service is received includes one of the following:

in a case that the random number is less than the second parameter, determining that the target state is the connected state; and in a case that the random number is greater than or equal to the second parameter, determining that the target state is the non-connected state.

Optionally, in the case that the second parameter is a proportion parameter of terminals that are allowed to receive a multicast service without entering the connected state, the determining, according to the comparison result between the random number and the second parameter, the target state in which the multicast service is received includes one of the following:

in a case that the random number is less than the second parameter, determining that the target state is the non-connected state; and in a case that the random number is greater than or equal to the second parameter, determining that the target state is the connected state.

Optionally, the receiving, by the terminal, state indication information sent by the network side device includes:

receiving, by the terminal, target information sent by the network side device, where the target information carries the state indication information; and the target information includes at least one of the following:

a system information block SIB; and a paging message used for multicast service activation notification.

Optionally, the method also includes:

sending, by the terminal, auxiliary information to the network side device;

where the auxiliary information includes at least one of the following:

power saving demand indication information;

reception effect indication information; and reception state indication information.

It should be noted that all descriptions about the terminal side in the above embodiments are applicable to this embodiment, and can achieve the same technical effects as those in the above embodiments, and will not be described again here.

Figure 6:
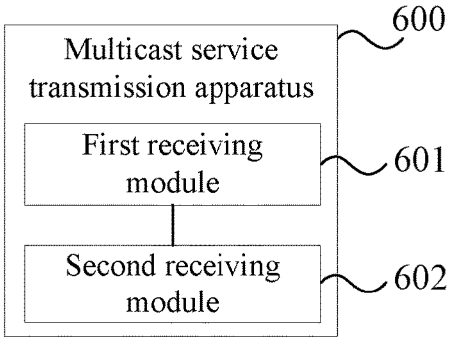
FIG. 6 is a schematic diagram of modules of a multicast service transmission apparatus according to an embodiment of this application.

As shown in FIG. 6, this embodiment of this application further provides a multicast service transmission apparatus 600, which includes:

a first receiving module 601, configured to receive state indication information sent by a network side device, where the state indication information is used to assist the terminal in determining a state when receiving a multicast service; and a second receiving module 602, configured to receive a multicast service according to the state indication information.

Optionally, the state indication information includes: reception state information;

where the reception state information includes at least one of the following:

the terminal receives a multicast service in a connected state;

the terminal can maintain reception of a multicast service in the current state;

the terminal can receive a multicast service in the connected state and the non-connected state;

a proportion parameter of terminals that can enter the connected state to receive a multicast service; and a proportion parameter of terminals that are allowed to receive a multicast service without entering the connected state.

Optionally, the reception state information is applicable to at least one of the following:

a cell that sends the state indication information;

a first multicast service; and a first area.

Optionally, when the reception state information includes: the terminal can receive a multicast service in the current state and non-connected state, the second receiving module 602 includes:

a first determining unit, configured to: according to a manner in which the network side device determines the state indication information, determine a target state in which the multicast service is received; and a first receiving unit, configured to receive the multicast service in the target state.

Optionally, the first determining unit is configured to implement at least one of the following:

in a case that the reception state information is determined by the network side device based on a first characteristic of the multicast service, compare, by the terminal, the first characteristic of the multicast service with a characteristic threshold, and determining, based on a comparison result, the target state in which the multicast service is received;

in a case that the reception state information is determined by the network side device based on a second parameter, generate, by the terminal, a random number, and determine, based on a comparison result between the random number and the second parameter, the target state in which the multicast service is received, where the second parameter includes: a proportion parameter of terminals that can enter the connected state to receive a multicast service; or a proportion parameter of terminals that are allowed to receive a multicast service without entering the connected state; and determine, according to a terminal requirement, the target state in which the multicast service is received.

Optionally, in a case that the first characteristic is a block error rate, the implementation of determining, based on a comparison result, the target state in which the multicast service is received includes one of the following:

in a case that a block error rate of a target service is greater than or equal to a block error rate threshold, determining that the target state is a non-connected state; and in a case that a block error rate of a target service is less than a block error rate threshold, determining that the target state is a connected state.

Optionally, the state indication information includes: a characteristic threshold of a multicast service that requires the terminal to enter a connected state for reception and/or a characteristic threshold of a multicast service that requires the terminal to remain in the current state for reception.

Optionally, the characteristic threshold includes: a block error rate threshold.

Optionally, the second receiving module 602 includes:

a second determining unit, configured to: according to a relationship between a block error rate of a target multicast service corresponding to the block error rate threshold and the block error rate threshold, determine the target state in which the multicast service is received; and the second receiving unit is configured to receive the target multicast service in the target state.

Optionally, the second determining unit is configured to implement at least one of the following:

in a case that the block error rate of the target multicast service is less than the block error rate threshold, determining that the target state is the connected state; and in a case that the block error rate of the target multicast service is greater than or equal to the block error rate threshold, determining that the target state is the non-connected state.

Optionally, the state indication information also includes at least one of the following:

a proportion parameter of terminals that can enter the connected state to receive a multicast service; and a proportion parameter of terminals that are allowed to receive a multicast service without entering the connected state.

Optionally, the second receiving module 602 includes:

a first obtaining unit, configured to generate a random number;

a fourth determining unit, configured to determine, according to the comparison result between the random number and the second parameter, the target state in which the multicast service is received; and a fourth receiving unit, configured to receive the multicast service in the target state;

where the second parameter includes: a proportion parameter of terminals that can enter the connected state to receive a multicast service; or a proportion parameter of terminals that are allowed to receive a multicast service without entering the connected state.

Optionally, in the case that the second parameter is a proportion parameter of terminals that can enter the connected state to receive a multicast service, the implementation of determining, according to the comparison result between the random number and the second parameter, the target state in which the multicast service is received includes one of the following:

in a case that the random number is less than the second parameter, determining that the target state is the connected state; and in a case that the random number is greater than or equal to the second parameter, determining that the target state is the non-connected state.

Optionally, in the case that the second parameter is a proportion parameter of terminals that are allowed to receive a multicast service without entering the connected state, the implementation of determining, according to the comparison result between the random number and the second parameter, the target state in which the multicast service is received includes one of the following:

in a case that the random number is less than the second parameter, determining that the target state is the non-connected state; and in a case that the random number is greater than or equal to the second parameter, determining that the target state is the connected state.

Optionally, the first receiving module 601 is configured to:

receive target information sent by the network side device, where the target information carries the state indication information; and the target information includes at least one of the following:

a system information block SIB; and a paging message used for multicast service activation notification.

Optionally, the apparatus also includes:

an auxiliary information sending module, configured to send auxiliary information to the network side device;

where the auxiliary information includes at least one of the following:

power saving demand indication information;

reception effect indication information; and reception state indication information.

It should be noted that this apparatus embodiment is an apparatus that corresponds one-to-one with the above-mentioned method embodiment. All implementations of the above-mentioned method are used in this apparatus embodiment and can achieve the same technical effect, which will not be described again here.

The multicast service transmission apparatus in the embodiment of this application may be an apparatus, an apparatus with an operating system or an electronic device, or it may be a component, an integrated circuit, or a chip in a terminal. The apparatus or electronic device may be a mobile terminal, or a non-mobile terminal. For example, the mobile terminal may include but is not limited to the foregoing listed types of terminals 11. The non-mobile terminal may be a server, a network attached storage (Network Attached Storage, NAS), a personal computer (personal computer, PC), a television (television, TV), a teller machine, or a self-service machine. This is not specifically limited in this embodiment of this application.

The multicast service transmission apparatus according to an embodiments of the present disclosure can implement the processes in the method embodiments in FIG. 5, and achieve the same technical effect. To avoid repetition, details are not described herein again.

Embodiments of this application also provide a terminal, including a processor and a communication interface. The communication interface is configured to receive state indication information sent by a network side device, where the state indication information is used to assist the terminal in determining a state when receiving a multicast service; and receive a multicast service according to the state indication information.

Figure 7:
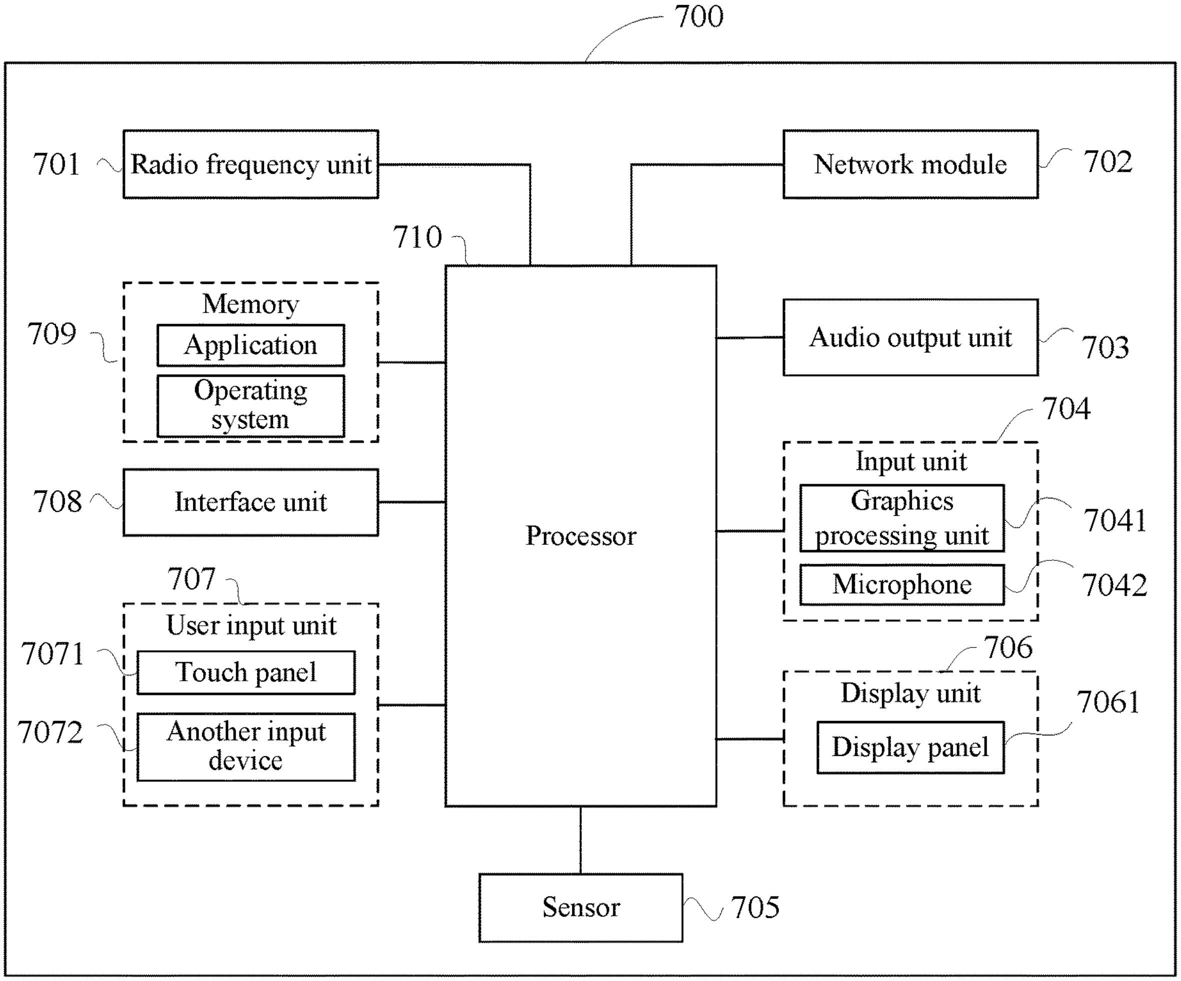
FIG. 7 is a structural block diagram of a terminal according to an embodiment of this application.

This terminal embodiment corresponds to the foregoing method embodiment on the terminal side. Each implementation process and implementation of the foregoing method embodiment may be applicable to this terminal embodiment, and a same technical effect can be achieved. Specifically, FIG. 7 is a schematic diagram of a hardware structure of a terminal according to an embodiment of this application.

A terminal 700 includes but is not limited to at least a part of components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a graphics processing unit (Graphics Processing Unit, GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a read-only memory (Read-only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 710 may include one or more processing units. Optionally, an application processor and a modem processor may be integrated into the processor 710. The application processor mainly processes an operating system, a user interface, an application, an instruction, or the like. The modem processor mainly processes wireless communication, for example, a baseband processor. It can be understood that, alternatively, the modem processor may not be integrated into the processor 710.

The radio frequency unit 701 is configured to:

receive state indication information sent by a network side device, where the state indication information is used to assist the terminal in determining a state when receiving a multicast service; and receive a multicast service according to the state indication information.

The terminal in the embodiment of this application selects, according to the state indication information sent by the network side device, the appropriate state for receiving the multicast service and receives the multicast service, which can avoid as much as possible that the system has excessively high loads or even is overloaded, and improve network efficiency and overall performance.

Optionally, the state indication information includes: reception state information;

where the reception state information includes at least one of the following:

the terminal receives a multicast service in a connected state;

the terminal can maintain reception of a multicast service in the current state;

the terminal can receive a multicast service in the connected state and the non-connected state;

a proportion parameter of terminals that can enter the connected state to receive a multicast service; and a proportion parameter of terminals that are allowed to receive a multicast service without entering the connected state.

Optionally, the reception state information is applicable to at least one of the following:

a cell that sends the state indication information;

a first multicast service; and a first area.

Optionally, when the reception state information includes: the terminal can receive a multicast service in a connected state and a non-connected state, the processor 710 is configured to implement:

according to a manner in which the network side device determines the state indication information, determine a target state in which the multicast service is received.

The radio frequency unit 701 is configured to receive the multicast service in the target state.

Optionally, the processor 710 is configured to implement at least one of the following:

in a case that the reception state information is determined by the network side device based on a first characteristic of the multicast service, compare, by the terminal, the first characteristic of the multicast service with a characteristic threshold, and determining, based on a comparison result, the target state in which the multicast service is received;

in a case that the reception state information is determined by the network side device based on a second parameter, generate, by the terminal, a random number, and determine, based on a comparison result between the random number and the second parameter, the target state in which the multicast service is received, where the second parameter includes: a proportion parameter of terminals that can enter the connected state to receive a multicast service; or a proportion parameter of terminals that are allowed to receive a multicast service without entering the connected state; and determine, according to a terminal requirement, the target state in which the multicast service is received.

Optionally, when the first characteristic is a block error rate, the processor 710 is configured to implement one of the following:

in a case that a block error rate of a target service is greater than or equal to a block error rate threshold, determining that the target state is a non-connected state; and in a case that a block error rate of a target service is less than a block error rate threshold, determining that the target state is a connected state.

Optionally, the state indication information includes: a characteristic threshold of a multicast service that requires the terminal to enter a connected state for reception and/or a characteristic threshold of a multicast service that requires the terminal to remain in the current state for reception.

Optionally, the characteristic threshold includes: a block error rate threshold.

Optionally, the processor 710 is configured to implement:

according to a relationship between a block error rate of a target multicast service corresponding to the block error rate threshold and the block error rate threshold, determine the target state in which the multicast service is received.

The radio frequency unit 701 is configured to receive the target multicast service in the target state.

Optionally, the processor 710 is configured to implement at least one of the following:

in a case that the block error rate of the target multicast service is less than the block error rate threshold, determining that the target state is the connected state; and in a case that the block error rate of the target multicast service is greater than or equal to the block error rate threshold, determining that the target state is the non-connected state.

Optionally, the state indication information also includes at least one of the following:

a proportion parameter of terminals that can enter the connected state to receive a multicast service; and a proportion parameter of terminals that are allowed to receive a multicast service without entering the connected state.

Optionally, the processor 710 is configured to implement:

generating a random number; and determining, according to the comparison result between the random number and the second parameter, the target state in which the multicast service is received.

The radio frequency unit 701 is configured to implement:

receiving the multicast service in the target state;

where the second parameter includes: a proportion parameter of terminals that can enter the connected state to receive a multicast service; or a proportion parameter of terminals that are allowed to receive a multicast service without entering the connected state.

Optionally, in the case that the second parameter is a proportion parameter of terminals that can enter the connected state to receive a multicast service, the processor 710 is configured to implement one of the following:

in a case that the random number is less than the second parameter, determining that the target state is the connected state; and in a case that the random number is greater than or equal to the second parameter, determining that the target state is the non-connected state.

Optionally, in the case that the second parameter is a proportion parameter of terminals that are allowed to receive a multicast service without entering the connected state, the processor 710 is configured to implement one of the following:

in a case that the random number is less than the second parameter, determining that the target state is the non-connected state; and in a case that the random number is greater than or equal to the second parameter, determining that the target state is the connected state.

Optionally, the radio frequency unit 701 is configured to implement:

receive target information sent by the network side device, where the target information carries the state indication information; and the target information includes at least one of the following:

a system information block SIB; and a paging message used for multicast service activation notification.

Optionally, the radio frequency unit 701 is configured to implement:

sending auxiliary information to the network side device;

where the auxiliary information includes at least one of the following:

power saving demand indication information;

reception effect indication information; and reception state indication information.

Preferably, an embodiment of this application further provides a terminal, including a processor, a memory, and a program or an instruction stored in the memory and executable on the processor. When the program or instruction is executed by the processor, each process of the embodiment of the foregoing multicast service transmission method, and the same technical effect can be achieved. To avoid repetition, details are not repeated herein.

An embodiment of this application further provides a readable storage medium. The readable storage medium stores a program or an instruction, and when the program or the instruction is executed by a processor, each process of the embodiment of the foregoing multicast service transmission method is performed and the same technical effects can be achieved. To avoid repetition, details are not described herein again. The computer readable storage medium is, for example, a read-only memory (Read-Only Memory, ROM for short), a random access memory (Random Access Memory, RAM for short), a magnetic disk, or an optical disc.

Figure 8:
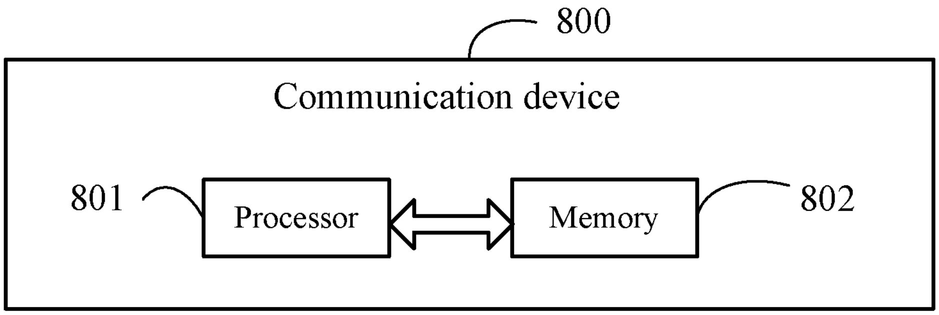
FIG. 8 is a structural block diagram of a communication device according to an embodiment of this application.

Optionally, as shown in FIG. 8, an embodiment of this application further provides a communication device 800, including a processor 801, a memory 802, and a program or an instruction stored in the memory 802 and executable on the processor 801. For example, when the communication device 800 is a terminal, when the program or instruction is executed by the processor 801, each process of the embodiment of the foregoing multicast service transmission method is performed, and the same technical effect can be achieved. When the communication device 800 is a network side device, when the programs or instructions are executed by the processor 801, each process of the above embodiment of the multicast service transmission indication method is performed, and the same technical effect can be achieved. To avoid repetition, details are not repeated herein.

The terminal involved in the embodiments of this application may be a device that provides voice and/or data connectivity to users, a handheld device with a wireless connection function, or other processing devices connected to a wireless modem, etc. In different systems, the names of the terminal device may be different. For example, in a 5G system, the terminal device may be called user equipment (User Equipment, UE). The wireless terminal device may communicate with one or more core networks (Core Network, CN) through a radio access network (Radio Access Network, RAN). The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal may be a device such as a personal communication service (Personal Communication Service, PCS) phone, a cordless telephone set, a session initiation protocol (Session Initiated Protocol, SIP) phone, a wireless local loop (Wireless Local Loop, WLL) station, or a personal digital assistant (Personal Digital Assistant, PDA). The wireless terminal device may also be called a system, a subscriber unit (subscriber unit), a subscriber station (subscriber station), a mobile station (mobile station), a mobile station (mobile), a remote station (remote station), or an access point (access point), a remote terminal device (remote terminal), an access terminal device (access terminal), a user terminal device (user terminal), a user agent (user agent), a user device (user device), which are not limited in the embodiments of this application.

The network side device involved in the embodiment of this application may be a base transceiver station (Base Transceiver Station, BTS for short) in a Global System for Mobile Communications (Global System of Mobile communication, GSM for short) or Code Division Multiple Access (Code Division Multiple Access, CDMA for short), or may be a NodeB (NodeB, NB for short) in Wideband Code Division Multiple Access (Wideband Code Division Multiple Access, WCDMA for short), or may be an evolved NodeB (Evolutional NodeB, eNB or eNodeB for short) in LTE, or a relay station or an access point, or a base station in a future 5G network, which is not limited herein.

The network side device and the terminal can each use one or more antennas for multi-input multi-output (Multi Input Multi Output, MIMO) transmission. MIMO transmission can be single-user MIMO (Single User MIMO, SU-MIMO) or multi-user MIMO (Multiple User MIMO, MU-MIMO). Depending on the shape and number of root antenna combinations, MIMO transmission can be 2D-MIMO, 3D-MIMO, FD-MIMO or massive-MIMO, or can be diversity transmission, precoding transmission or beamforming transmission, etc.

An embodiment of this application further provides a chip. The chip includes a processor and a communication interface. The communication interface is coupled to the processor. The processor is configured to run programs or instructions to implement each process in the above embodiments of the multicast service transmission indication method or multicast service transmission method, and the same technical effect can be achieved. To avoid duplication, it will not be described again here.

It should be understood that the chip mentioned in this embodiment of this application may also be referred to as a system-level chip, a system chip, a chip system, or an on-chip system chip.

Embodiments of this application also provide a computer program product, which is stored in a readable storage medium. The computer program product is executed by at least one processor to implement each process in the above embodiments of the multicast service transmission indication method or multicast service transmission method, and the same technical effect can be achieved. To avoid duplication, it will not be described again here.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A multicast service transmission indication method, comprising:

sending, by a network side device, state indication information to a terminal;

wherein the state indication information is used to assist the terminal in determining a state when receiving a multicast service, and the state indication information comprises reception state information, wherein the reception state information comprises at least one of the following: the terminal receives the multicast service in a connected state; the terminal can maintain reception of the multicast service in a current state; or the terminal can receive the multicast service in the connected state and a non-connected state, and wherein the reception state information is at a cell granularity, and first reception state information applicable to a first cell is different from second reception state information applicable to a second cell.

2. The method according to claim 1, wherein the reception state information further comprises at least one of the following:

a proportion parameter of terminals that can enter the connected state to receive the multicast service; and a proportion parameter of terminals that are allowed to receive the multicast service without entering the connected state.

3. The method according to claim 2, wherein the reception state information is applicable to at least one of the following:

a cell that sends the state indication information;

a first multicast service; and a first area.

4. The method according to claim 2, wherein before the network side device sends the state indication information to the terminal, the method further comprises:

determining, by the network side device according to a first parameter, the reception state information corresponding to the terminal and the multicast service;

wherein the first parameter comprises: quality of service (QoS) and/or network load of the multicast service.

5. The method according to claim 1, wherein the state indication information comprises: a characteristic threshold of the multicast service that requires the terminal to enter the connected state for reception and/or a characteristic threshold of the multicast service that requires the terminal to remain in the current state for reception.

6. The method according to claim 5, wherein the characteristic threshold comprises: a block error rate threshold.

7. The method according to claim 1, wherein the sending, by the network side device, the state indication information to the terminal comprises:

sending, by the network side device, target information to the terminal, wherein the target information carries the state indication information; and the target information comprises at least one of the following:

a system information block (SIB); and a paging message used for multicast service activation notification.

8. The method according to claim 1, further comprising:

receiving, by the network side device, auxiliary information sent by the terminal;

wherein the auxiliary information comprises at least one of the following:

power saving demand indication information;

reception effect indication information; and reception state indication information.

9. A multicast service transmission method, comprising:

receiving, by a terminal, state indication information sent by a network side device, wherein the state indication information is used to assist the terminal in determining a state when receiving a multicast service; and receiving, by the terminal, the multicast service according to the state indication information, wherein the state indication information comprises reception state information, wherein the reception state information comprises at least one of the following: the terminal receives the multicast service in a connected state; the terminal can maintain reception of the multicast service in a current state; or the terminal can receive the multicast service in the connected state and a non-connected state, and wherein the reception state information is at a cell granularity, and first reception state information applicable to a first cell is different from second reception state information applicable to a second cell.

10. The method according to claim 9, wherein the reception state information further comprises at least one of the following:

a proportion parameter of terminals that can enter the connected state to receive the multicast service; and a proportion parameter of terminals that are allowed to receive the multicast service without entering the connected state.

11. The method according to claim 10, wherein the reception state information is applicable to at least one of the following:

a cell that sends the state indication information;

a first multicast service; and a first area.

12. The method according to claim 10, wherein when the reception state information comprises: the terminal can receive the multicast service in the current state and the non-connected state, the receiving, by the terminal, the multicast service according to the state indication information comprises:

according to a manner in which the network side device determines the state indication information, determining, by the terminal, a target state in which the multicast service is received; and receiving, by the terminal, the multicast service in the target state.

13. The method according to claim 12, wherein the determining, by the terminal according to the manner in which the network side device determines the state indication information, the target state in which the multicast service is received comprises at least one of the following:

in a case that the reception state information is determined by the network side device based on a first characteristic of the multicast service, comparing, by the terminal, the first characteristic of the multicast service with a characteristic threshold, and determining, based on a comparison result, the target state in which the multicast service is received;

in a case that the reception state information is determined by the network side device based on a second parameter, generating, by the terminal, a random number, and determining, based on a comparison result between the random number and the second parameter, the target state in which the multicast service is received, wherein the second parameter comprises: a proportion parameter of terminals that can enter the connected state to receive the multicast service; or a proportion parameter of terminals that are allowed to receive the multicast service without entering the connected state; and determining, according to a terminal requirement, the target state in which the multicast service is received.

14. The method according to claim 9, wherein the state indication information comprises: a characteristic threshold of the multicast service that requires the terminal to enter the connected state for reception and/or a characteristic threshold of the multicast service that requires the terminal to remain in the current state for reception.

15. The method according to claim 14, wherein the characteristic threshold comprises: a block error rate threshold.

16. The method according to claim 14, wherein the state indication information further comprises at least one of the following:

a proportion parameter of terminals that can enter the connected state to receive the multicast service; and a proportion parameter of terminals that are allowed to receive the multicast service without entering the connected state.

17. The method according to claim 9, wherein the receiving, by the terminal, the state indication information sent by the network side device comprises:

receiving, by the terminal, target information sent by the network side device, wherein the target information carries the state indication information; and the target information comprises at least one of the following:

a system information block (SIB); and a paging message used for multicast service activation notification.

18. The method according to claim 9, further comprising:

sending, by the terminal, auxiliary information to the network side device;

wherein the auxiliary information comprises at least one of the following:

power saving demand indication information;

reception effect indication information; and reception state indication information.

19. A network side device, comprising a processor, a memory, and a program or instruction stored on the memory and executable on the processor, wherein when the program or instruction is executed by the processor, steps of the multicast service transmission indication method according to claim 1 are implemented.

20. A terminal, comprising a processor, a memory, and a program or an instruction stored in the memory and executable on the processor, wherein when the program or instruction is executed by the processor, the following steps are implemented:

receiving, by the terminal, state indication information sent by a network side device, wherein the state indication information is used to assist the terminal in determining a state when receiving a multicast service; and receiving, by the terminal, the multicast service according to the state indication information, wherein the state indication information comprises reception state information, wherein the reception state information comprises at least one of the following: the terminal receives the multicast service in a connected state; the terminal can maintain reception of a multicast service in a current state; or the terminal can receive the multicast service in the connected state and a non-connected state, and wherein the reception state information is at a cell granularity, and first reception state information applicable to a first cell is different from second reception state information applicable to a second cell.

* * * * *